United States Patent
Park et al.

(10) Patent No.: US 9,904,438 B2
(45) Date of Patent: Feb. 27, 2018

(54) MOBILE TERMINAL AND METHOD FOR CONTROLLING THE SAME

(71) Applicant: LG ELECTRONICS INC., Seoul (KR)

(72) Inventors: Hyeonsang Park, Seoul (KR); Yeonseok Seong, Seoul (KR); Eunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/091,506

(22) Filed: Apr. 5, 2016

(65) Prior Publication Data

US 2017/0060315 A1    Mar. 2, 2017

(30) Foreign Application Priority Data

Aug. 26, 2015 (KR) .......................... 10-2015-0120378

(51) Int. Cl.
*G06F 3/0482* (2013.01)
*G06F 3/0488* (2013.01)

(52) U.S. Cl.
CPC .......... *G06F 3/0482* (2013.01); *G06F 3/0488* (2013.01)

(58) Field of Classification Search
CPC .... G06F 3/0414; G06F 3/0412; G06F 3/0416; G06F 3/04886; G06F 3/04817; G06F 3/0482; G06F 2203/04105; G06F 3/0488
See application file for complete search history.

(56) References Cited

U.S. PATENT DOCUMENTS

| 2010/0017710 | A1  | 1/2010 | Kim et al. |
| 2010/0026640 | A1  | 2/2010 | Kim et al. |
| 2011/0063248 | A1* | 3/2011 | Yoon .................... G06F 3/0485 345/174 |
| 2013/0019182 | A1* | 1/2013 | Gil ........................ G06F 3/0482 715/738 |

(Continued)

FOREIGN PATENT DOCUMENTS

KR    10-2015-0061336    6/2015

OTHER PUBLICATIONS

PCT International Application No. PCT/KR2016/003717, Notification of Transmittal of the International Search Report and the Written Opinion of the International Searching Authority, or Declaration dated Jun. 30, 2016, 10 pages.

*Primary Examiner* — Latanya Bibbins
(74) *Attorney, Agent, or Firm* — Lee Hong Degerman Kang & Waimey

(57) ABSTRACT

The present invention relates to a mobile terminal capable of sensing force of a touch and a control method thereof. A mobile terminal according to one embodiment includes a touch screen capable of outputting screen information corresponding to a specific function, and a controller capable of controlling the touch screen to output a function key for controlling an output state of the screen information when it is detected that force of a touch applied to the touch screen is more than a preset first force, and capable of controlling the touch screen to change the function key to a function icon for executing a different function from the specific function when it is detected that the force of the touch is changed to a second force or more while the function key is output, the second force being stronger than the first force.

9 Claims, 16 Drawing Sheets

(56) References Cited

U.S. PATENT DOCUMENTS

2015/0026619 A1\* 1/2015 Lee .................. G06F 3/0486
                                                 715/769
2015/0268802 A1\* 9/2015 Kim .................. G06F 3/0482
                                                 715/763
2016/0259495 A1\* 9/2016 Butcher ............ G06F 3/0482

\* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0120378, filed on Aug. 26, 2015, the contents of which is incorporated by reference herein in its entirety.

BACKGROUND OF THE INVENTION

1. Field of the Invention

This specification relates to a mobile terminal capable of detecting touch force (touch pressure), and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

A display unit of a mobile terminal is implemented in the form of a touch screen so as to provide different user interfaces based on various types of touch inputs. However, such a touch applied through the touch screen is given in a two-dimensional (2D) touch manner, which has a spatial limitation. Therefore, to provide more various and intuitive touch methods, terminals, which are capable of applying various control commands by using touch force (or pressure) for providing a three-dimensional (3D) touch method, are under development.

SUMMARY OF THE INVENTION

Therefore, an aspect of the detailed description is to provide a mobile terminal capable of implementing various user interfaces by using touch force (or pressure), and a method for controlling the same.

Another aspect of the detailed description is to provide a mobile terminal capable of facilitating different controls involved in specific screen information to be performed in response to a change of force (or pressure) of a touch, while the specific screen information is output on a touch screen, and a method for controlling the same.

To achieve these and other advantages and in accordance with the purpose of this specification, as embodied and broadly described herein, there is provided a mobile terminal including a touch screen capable of outputting screen information corresponding to a specific function, and a controller capable of controlling the touch screen to output a function key for controlling an output state of the screen information when it is detected that force of a touch applied to the touch screen is more than a preset first force, and capable of controlling the touch screen to change the function key to a function icon for executing a different function from the specific function when it is detected that the force of the touch is changed to a second force or more while the function key is output, the second force being stronger than the first force.

In accordance with one exemplary embodiment disclosed herein, the controller may output a plurality of function keys corresponding to different types of functions on the touch screen, and control the touch screen to change the output state of the screen information to correspond to one of the plurality of function keys, when the touch is released at an output point of the one function key.

In accordance with one exemplary embodiment disclosed herein, the one function key may be output within a preset distance from the touch-applied point. The controller may control the touch screen to vary a changed degree of the output state of the screen information, based on a degree that the touch is moved close to the output point of the one function key.

In accordance with one exemplary embodiment disclosed herein, the controller may control the touch screen to vary the output state of the screen information based on a changed degree of the force of the touch when the change of the force of the touch is detected at a point corresponding to the one function key.

In accordance with one exemplary embodiment disclosed herein, the different function may be a function having similar attribute information to the specific function.

In accordance with one exemplary embodiment disclosed herein, the attribute information may be related to at least one of a type, execution frequency, executed time and setting information, involved in an application corresponding to the different function.

In accordance with one exemplary embodiment disclosed herein, the controller may control the touch screen to output preview information related to an execution screen of an application corresponding to one of the function icons on at least one area of the touch screen, while the touch is maintained on the one function icon.

In accordance with one exemplary embodiment disclosed herein, the controller may control the touch screen to output the execution screen of the application corresponding to the one function icon on at least part of the touch screen when the touch is released while the preview information is output. The controller may control the touch screen to change the preview information into another preview information related to an execution screen of an application corresponding to another function icon, when the touch is moved to another function icon, different from the one function icon, of the function icons, while the preview information is output.

In accordance with one exemplary embodiment disclosed herein, the controller may control the touch screen to output preview information related to a different execution screen of the application corresponding to the one function icon based on a changed degree of the force of the touch when the change of the force of the touch is detected on the one function icon.

In accordance with one exemplary embodiment disclosed herein, the controller may control the touch screen to output preview information related to an execution screen of a first sub menu included in the application corresponding to the one function icon when it is detected that the force of the touch is changed by a first changed degree. The controller may control the touch screen to output preview information related to an execution screen of a second sub menu included in the application corresponding to the one function icon when it is detected that the force of the touch is changed by a second changed degree.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
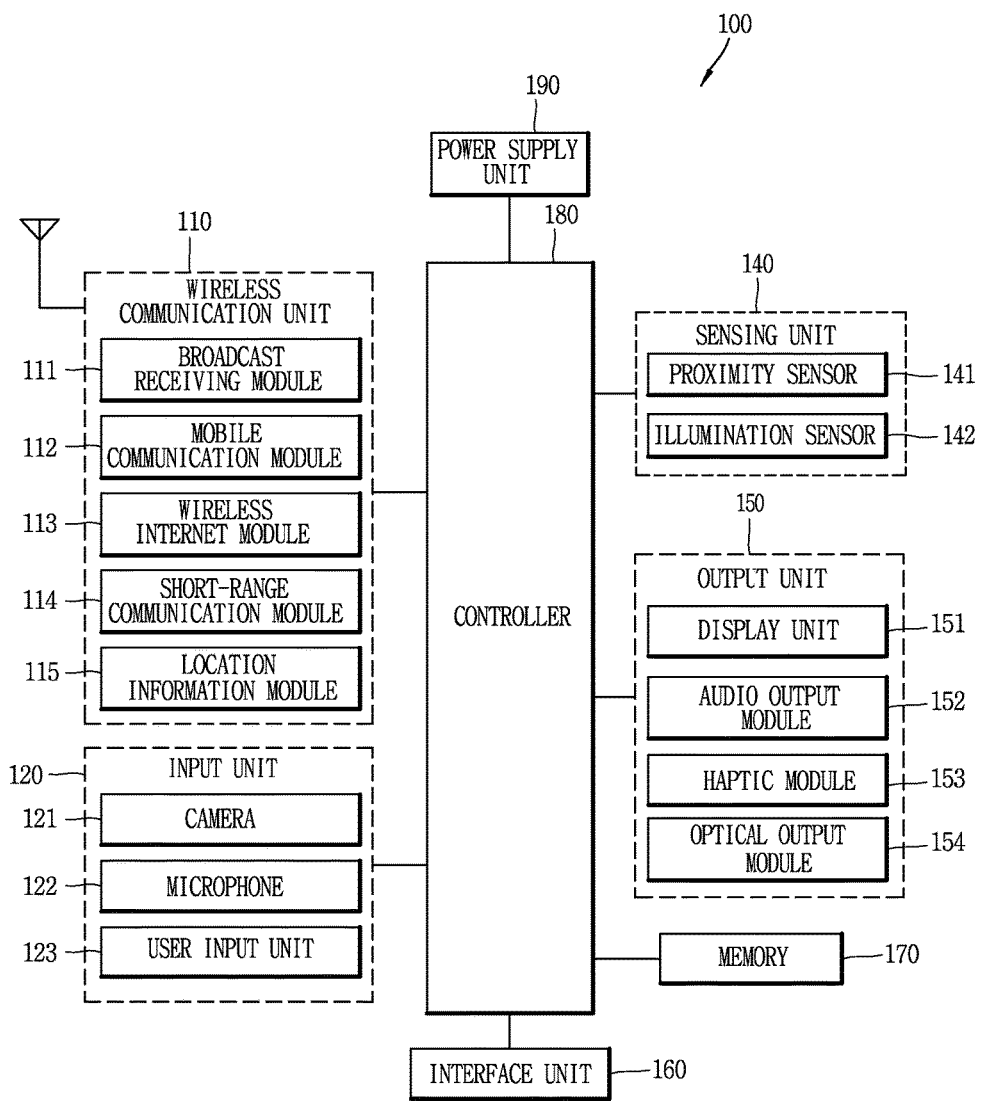
FIG. 1A is a block diagram of a mobile terminal in accordance with one exemplary embodiment of the present invention.
Figure 1B:
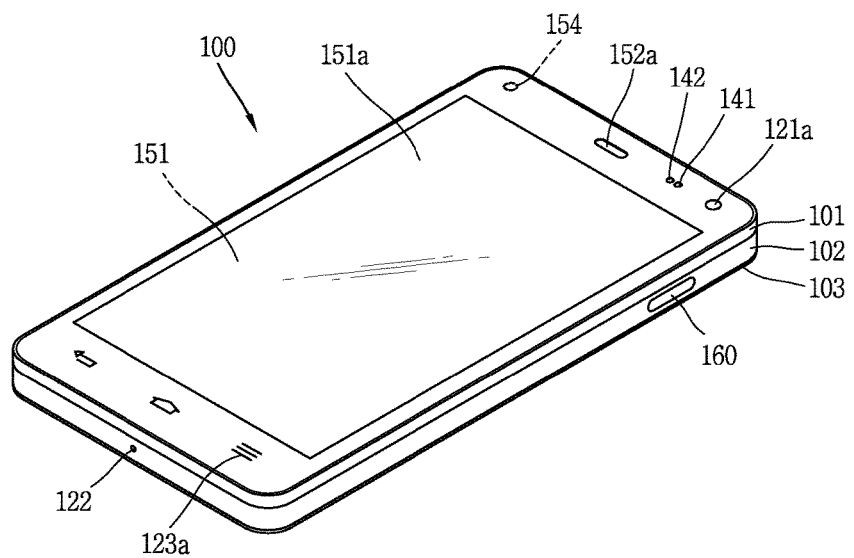
FIGS. 1B and 1C are conceptual views illustrating one example of a mobile terminal, viewed from different directions.
Figure 1C:
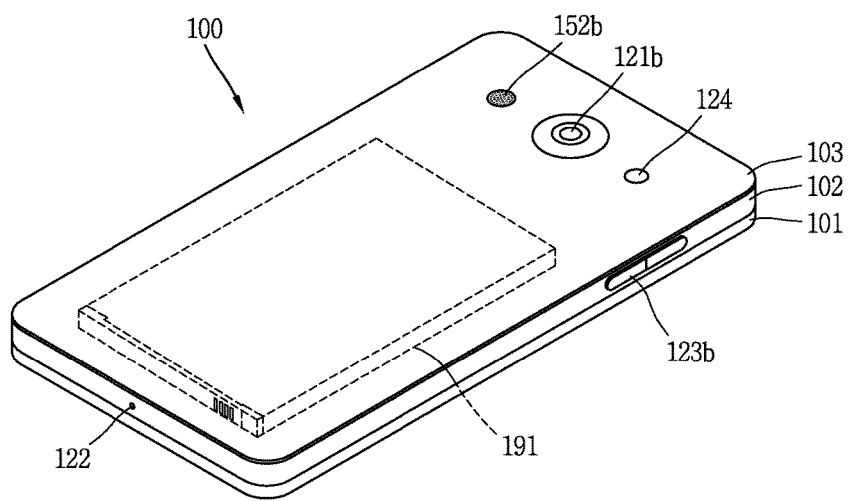

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/ receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped by, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a method for controlling a mobile terminal in accordance with one exemplary embodiment will be described in more detail with reference to the accompanying drawings.

The mobile terminal according to one exemplary embodiment disclosed herein can implement various user interfaces using force (or pressure) of a touch applied to a touch screen. In more detail, screen information output on the touch screen may change in various manners, when it is detected that force (or pressure) of a touch applied to the touch screen is more than a preset force or when the force of the touch detected as more than the preset force is re-changed.

Therefore, the user can obtain convenience in variously controlling previously-output screen information in a manner of adjusting an applied force of a touch as well as changing a touch method.

Figure 2A:
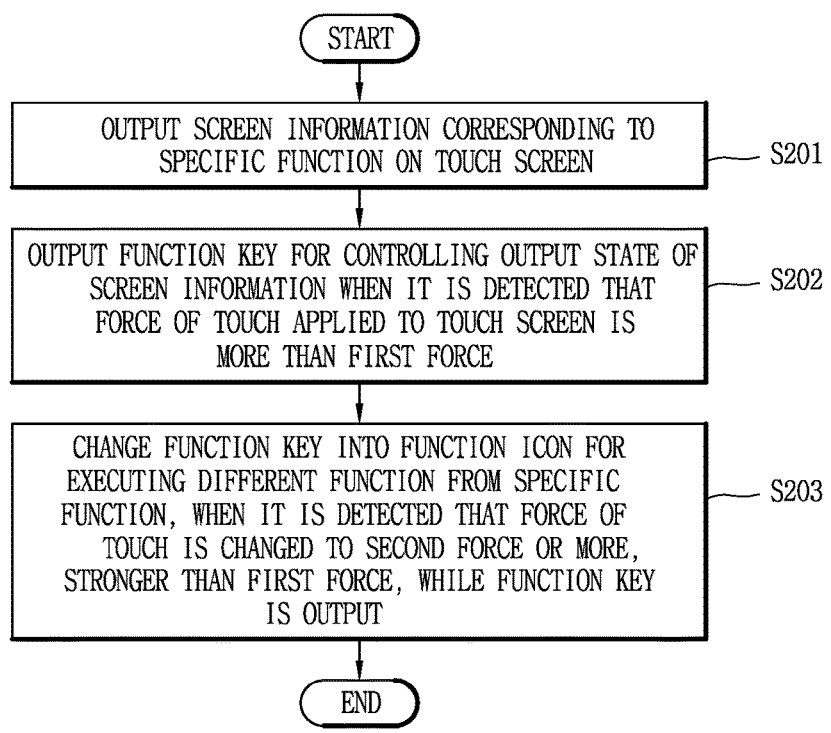
FIG. 2A is a flowchart illustrating a method for controlling a mobile terminal in accordance with one exemplary embodiment disclosed herein.
Figure 2B:
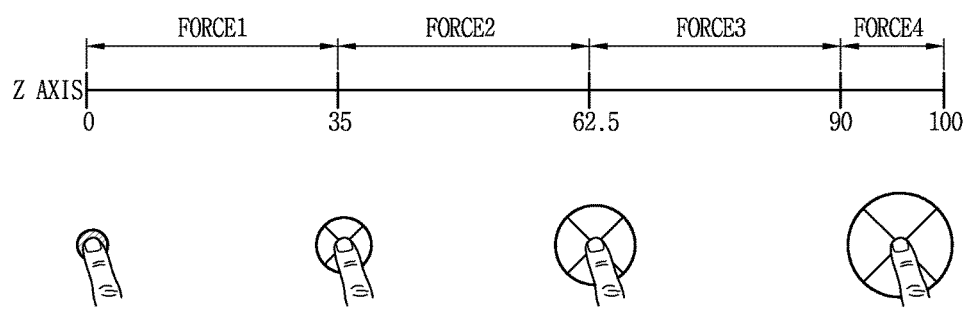
FIG. 2B is a conceptual view illustrating touch force (or touch pressure)
Figure 2C:
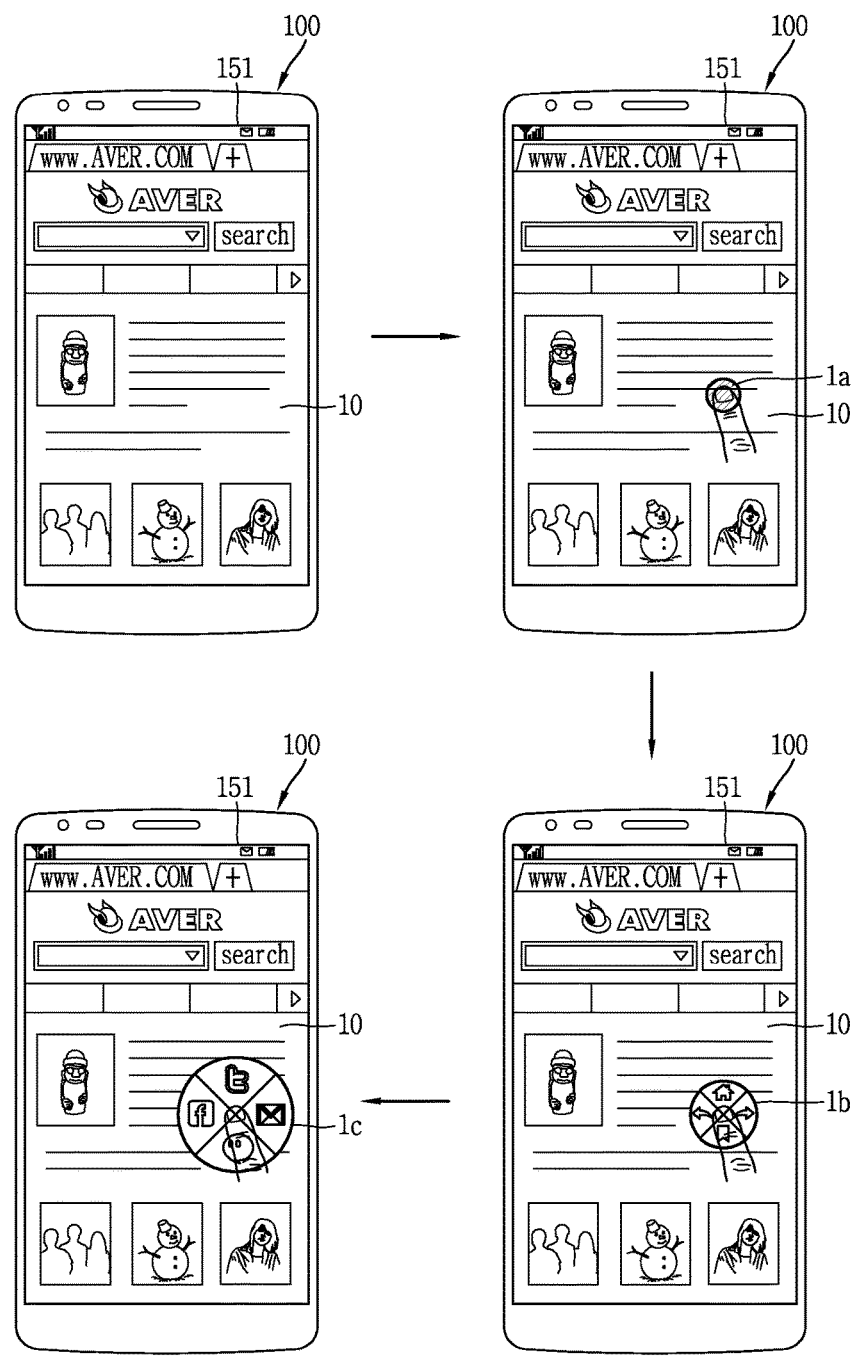
FIG. 2C is a representative view illustrating a control method of a mobile terminal in accordance with one exemplary embodiment disclosed herein.

FIG. 2A is a flowchart illustrating a method for controlling a mobile terminal in accordance with one exemplary embodiment disclosed herein, FIG. 2B is a conceptual view illustrating touch force, and FIG. 2C is a representative view illustrating a control method of a mobile terminal in accordance with the one exemplary embodiment disclosed herein.

First, referring to FIG. 2A, screen information corresponding to a specific function may be output on a touch screen of a mobile terminal in accordance with one exemplary embodiment disclosed herein (S201).

The specific function may be a function corresponding to any type of function which is executable on the mobile terminal. Examples of the specific function may include a function corresponding to an application executable on the mobile terminal 100, a function providing a work space including execution icons of a preset application on the mobile terminal 100, a lock function of restricting a reception of a control command by a touch, and the like.

The screen information corresponding to the specific function may include an execution screen corresponding to a specific application, a home screen page including execution icons corresponding to a plurality of applications, respectively, a lock screen and the like. That is, as illustrated in a first drawing of FIG. 2C, the touch screen 151 may output thereon an execution screen 100 of an application corresponding to a specific function (e.g., an Internet search function).

In this manner, when a touch is applied to the touch screen 151 while the screen information is output, if the touch is detected to have been applied to the touch screen 151 with a first force (or pressure) or more, the controller 180 may control the touch screen 151 to output function keys for controlling the output state of the screen information.

In more detail, the controller 180 may analyze force of a touch applied through the touch screen 151. For example, the controller 180 may analyze force of a touch applied to one point of the touch screen 151, based on a value detected by a pressure sensor that is capable of detecting the force of the touch. As another example, the controller 180 may analyze a change of force of a touch on the basis of the fact that an area of a finger brought into contact with the touch screen varies in response to the change of the force of the touch.

When the force of the touch is analyzed, the controller 180 may recognize to which stage of a plurality of stages (levels) the analyzed force of the touch corresponds, by using the plurality of stages which are set with respect to the force of the touch.

That is, referring to FIG. 2B, when force of a touch is changed in a Z-axial direction (i.e., a direction perpendicular to a surface of the touch screen 151), the controller 180 may preset a plurality of stages with respect to the force of the touch. For example, under assumption that the greatest force is 100 and the lowest force is 0 with respect to touches detectable through the touch screen 151, the controller 180 may set forces between 0 and 100 as a plurality of stages (four stages), and process touches having forces corresponding to the stages, respectively, as different inputs.

As a more detailed example, the controller 180 may process a touch corresponding to force in the range of about 0 to 35 (Force 1) as a simple touch. The controller 180 may also set a touch corresponding to force in the range of 35 to 62.5 as a touch applied with a first force or more (Force 2), and a touch corresponding to force in the range of 62.5 to 90 as a touch applied with a second force or more (Force 3). Also, the controller 180 may process a touch corresponding to force in the range of 90 to 100 (Force 4) as a long touch.

In this manner, by using the plurality of stages with respect to force (or pressure) of a touch, the controller 180 can identify force of a touch applied to the touch screen 151 on the stage basis. And, the controller 180 may change screen information output on the touch screen 151 in various manners according to a stage of the plurality of stages which the touch corresponds to.

Also, the controller 180 may output a specific visual effect on the touch screen 151 such that the user can recognize to which stage of the plurality of stages the force of the touch corresponds. That is, the controller 180 may control the touch screen 151 to output a different visual effect, in response to a change of the force of the touch, on a point of the touch screen 151 to which the touch has been applied.

For example, when a touch with force corresponding to Force 1 is applied while the screen information is output, the controller 180 may process the touch as an input for selecting the touch-applied point on the screen information. The controller 180, as illustrated in a second drawing of FIG. 2C, may also control the touch screen 151 to output a specific visual effect 1*a* corresponding to the force of Force 1 on the touch-applied point.

If the force of the touch detected is more than a preset first force, the controller 180 may control the touch screen 151 to output function keys for controlling the output state of the screen information.

Here, the function key may be a graphic object corresponding to a function which can change an output state of at least part of the screen information while a specific function is maintained. For example, the function key may include a plurality of keys for changing settings related to the specific function while the specific function is maintained, keys corresponding to sub menus, which are different from the screen information, among sub menus included in the specific function, and the like.

In more detail, the function key may correspond to a function of switching the screen information into another screen information corresponding to the specific function, or a function of outputting specific information on at least part of the screen information. As another example, the function key may correspond to a function for changing output settings, such as brightness, color, transparency, resolution and the like, with respect to at least part of the screen information.

Also, the controller 180 may control the touch screen 151 to output several function keys, which meet a specific condition among a plurality of function keys allowing the change of the output state of the screen information, within a preset distance from the touch-applied point. Here, the specific condition, for example, may correspond to a function key corresponding to a function which is frequently used by the user, a preset number of function keys, and the like.

In more detail, as illustrated in a third drawing of FIG. 2C, when it is detected that the touch is applied by force (more than the first force) belonging to the range of Force 1 to Force 2, the controller 180 may control the touch screen 151 to change the specific visual effect 1*a* into an area 1*b* including a plurality of function keys. In this instance, the area 1*b* including the preset function keys may have a size corresponding to the touch force more than the first force, and thus be greater than the specific visual effect 1*a*.

The controller 180 may control the touch screen 151 to output function keys preset for controlling the output state of the screen information 10 (e.g., a key for switching an execution screen corresponding to the specific function into a home screen, a key for switching a screen into another execution screen of the specific function, etc.) within a preset distance from the touch-applied point.

In this manner, when it is detected that the force of the touch is changed to more than a second force which is greater than the first force while the function keys are output, the controller 180 may control the touch screen 151 to change the function keys into function icons for executing functions different from the specific function (S203).

Here, the function icon may be an execution icon for executing a function different from the specific function, and the different function may be a function having attribute information similar to the specific function among executable functions on the mobile terminal. The attribute information may be information related to at least one of a type, execution frequency, execution time (or moment) and setting information, all related to an application corresponding to the different function.

For example, the controller 180 may decide applications, which correspond to similar types to an application corresponding to the specific function, as the different functions. As a more detailed example, when the specific function corresponds to a message application, the controller 180 may decide messenger-related applications corresponding to similar types to the message application as the different functions.

As another example, the controller 180 may decide as the different functions applications which have been executed at a similar moment to an execution time (executed time) of an application corresponding to the specific function, or applications which have been executed with similar frequencies to the application corresponding to the specific function. As a more detailed example, applications which are frequently executed along with the application corresponding to the specific function or applications which are executed in response to an execution of the application corresponding to the specific function may correspond to the different functions.

As another example, the controller 180 may decide applications, which have been set by the user as associated applications with the application corresponding to the specific function, as the different functions.

In this manner, when the different functions are decided, the controller 180 may switch the function keys into the function icons and output the function icons, when it is detected that the force of the touch which has been detected to be more than the first force is changed to a second force or more.

In this instance, the controller 180 may control the touch screen 151 to output the function icons on an area corresponding to an output area of the function keys. That is, as illustrated in a fourth drawing of FIG. 2C, the function icons corresponding to the different functions from the specific function may be output within an area 1c which is formed greater than the output area 1b of the function keys.

The controller 180 may control the touch screen 151 to output the function icons to be greater than the function keys, in response to the change of the force of the touch from the first force to more than the second force. However, the output form of the function keys and the function icons may not necessarily be limited to the form, and alternatively be changed by settings in various manners.

In this manner, function keys can be output within a preset distance from a touch-applied point, in response to the touch, which is detected to be applied by more than a specific force is detected, while screen information is output on the touch screen 151.

This may facilitate the user to perform a desired control of screen information by using function keys output adjacent to a touch-applied point, without inconvenience in having to apply a touch directly to a point corresponding to a position of each function key scattered on the touch screen 151 or having to use a hardware key separately provided on the mobile terminal 100.

Also, the user can obtain convenience in easily executing another function associated with a currently-executed function, in response to a change of an applied force of the touch into a different force greater than a specific force.

As aforementioned, while the function key or function icon is output, the user can execute a control corresponding to the function key or function icon in a manner of moving the touch to a point corresponding to the function key or function icon.

Hereinafter, description will be given of an exemplary embodiment of executing various functions in a manner of moving the touch toward the function keys or function icons.

Figure 3A:
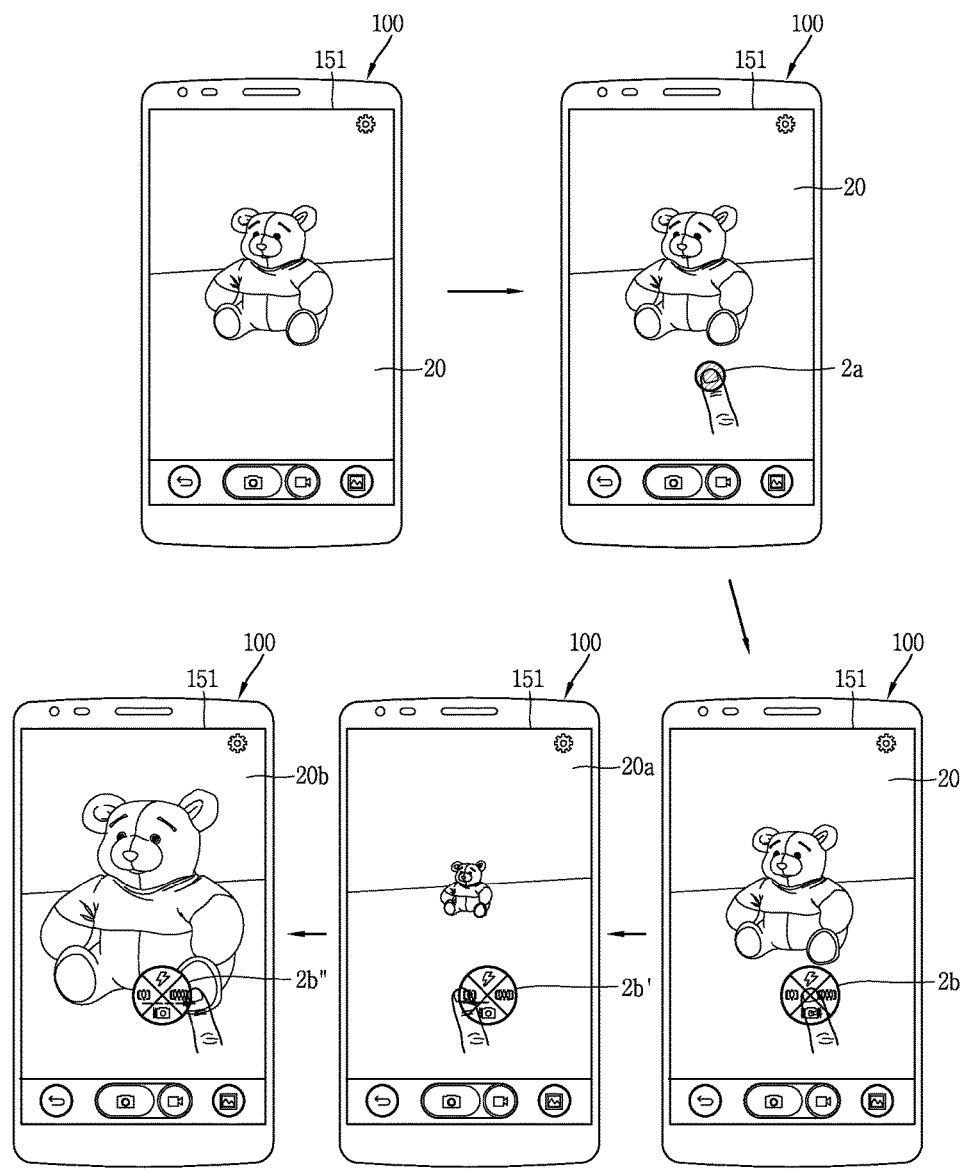
FIGS. 3A, 3B and 3C are views illustrating an exemplary embodiment in which screen information is controlled in response to a touch while function keys are output.
Figure 3B:
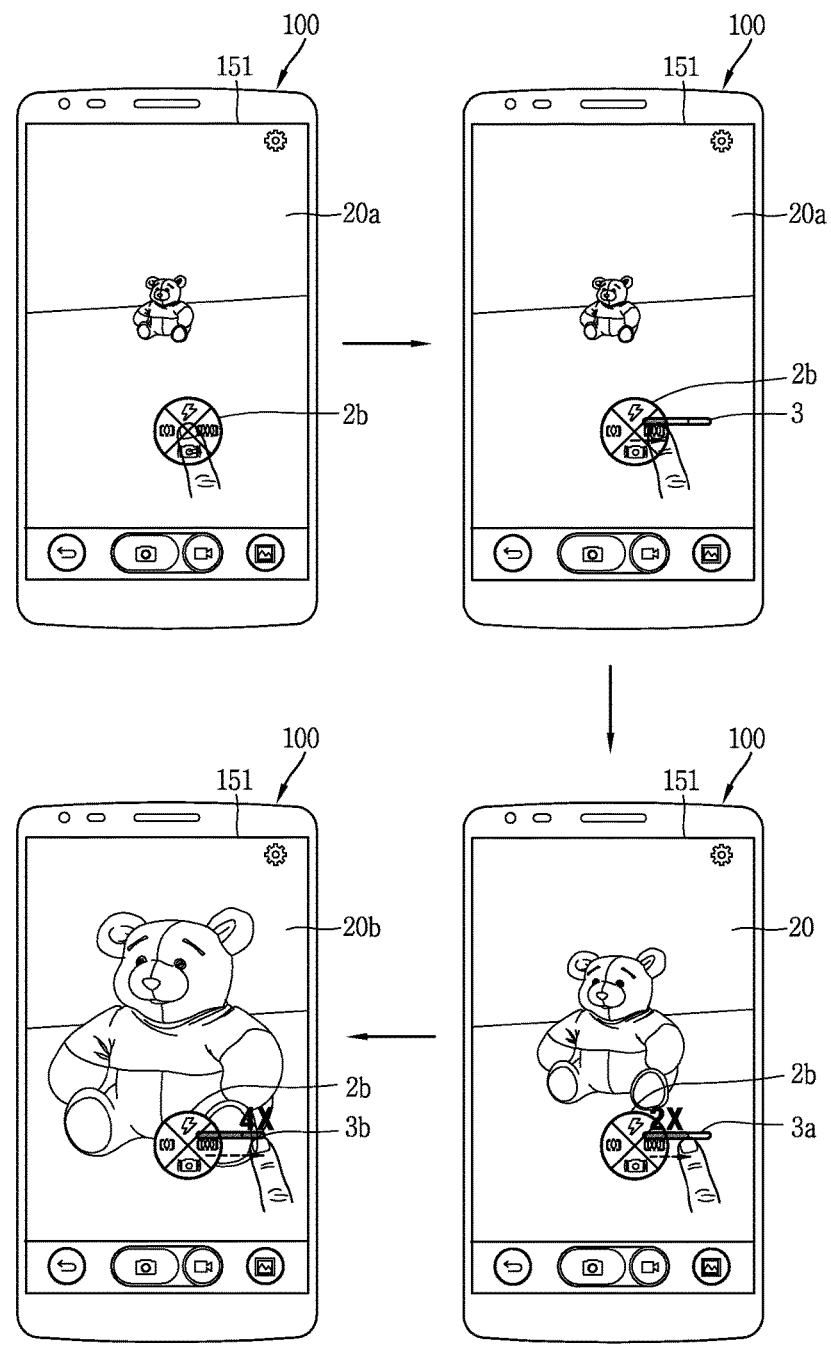
Figure 3C:
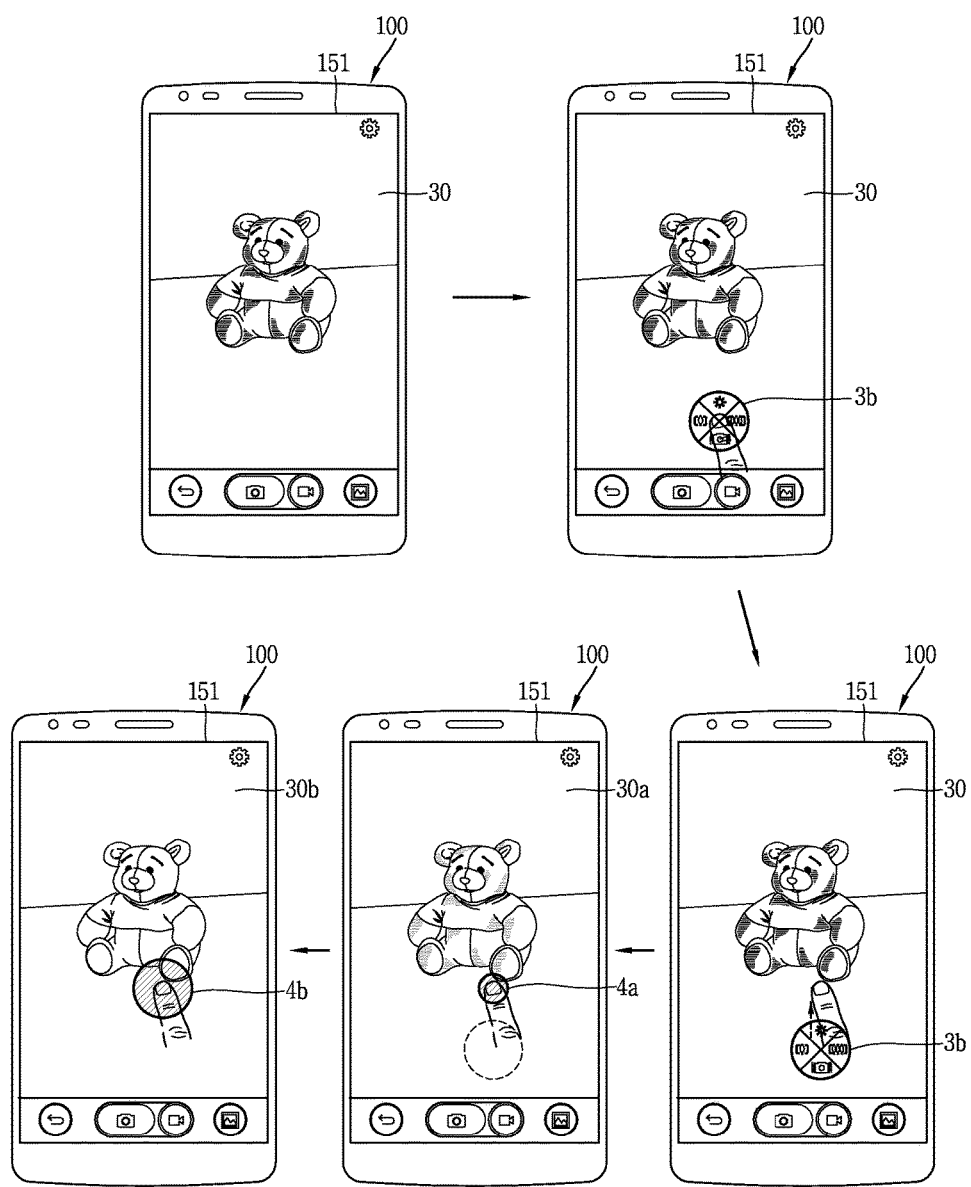

FIGS. 3A, 3B and 3C are views illustrating an exemplary embodiment in which screen information is controlled based on a touch while function keys are output.

First, referring to FIG. 3A, screen information 20 corresponding to a capturing function by a camera may be output on the touch screen 151. As illustrated in a second drawing of FIG. 3A, in the output state of the screen information 20, a touch may be applied to the touch screen 151. The controller 180 may control the touch screen 151 to output a specific visual effect 2a corresponding to force (or pressure) of the touch on the touch-applied point.

Afterwards, when it is detected that the force of the touch is more than a preset first force, the controller 180 may control the touch screen 151 to change the specific visual effect 2a into an area 2b which includes a plurality of function keys for controlling the output state of the screen information 20.

In more detail, the area 2b may include specific setting keys for controlling the output state of the screen information 20. Also, the controller 180 may arrange the specific setting keys on the area 2b within a preset distance from the touch-applied point, based on a preset reference.

For example, the controller 180 may control the touch screen 151 to arrange setting keys corresponding to contrary functions, respectively, in different directions based on the touch-applied point. As a more detailed example, in relation to a setting for changing an output ratio of the screen information 20, the controller 180 may control the touch screen 151 to arrange a setting key corresponding to a function of scaling up at least one area of the screen information 20 at a right side of the touch-applied point, and a setting key corresponding to a function of scaling down at least one area of the screen information 20 at a left side of the touch-applied point.

When the touch is moved toward one of the function keys arranged within the area 2b, for example, when the touch is dragged toward one of the function keys without being released, the controller 180 may control the touch screen 151 to change the output state of the screen information 20 according to a function corresponding to the touch-moved function key.

That is, as illustrated in a fourth drawing of FIG. 3A, when the touch is moved toward a setting key 2b' for scaling down at least one area of the screen information 20, the controller 180 may control the touch screen 151 to output screen information 20a whose at least part is scaled down.

As illustrated in a fifth drawing of FIG. 3A, without releasing the touch on the setting key 2b', when the touch is moved toward a setting key 2b" for scaling up the at least one of the screen information 20, the controller 180 may change the scaled-down screen information 20a into scaled-up screen information 20b and output the scaled-up screen information 20b.

Also, when the touch is moved to one of the setting keys, the controller 180 may control the touch screen 151 to vary a changed degree of the output state of the screen information on the basis of a degree that the touch is moved close to the one setting key.

On the contrary, when the touch is moved to the one setting key, the controller 180 may output an adjustment bar, which indicates a degree to adjust the screen information according to the one setting key, on the touch screen 151.

That is, as illustrated in a first drawing of FIG. 3B, in the state that the area 2b including the function keys are output on the touch screen 151, as illustrated in a second drawing of FIG. 3B, the touch may be moved to one of the function keys. In this instance, the controller 180 may control the touch screen 151 to output an adjustment bar 3 corresponding to the one function key.

Afterwards, as illustrated in a third drawing of FIG. 3B, when the touch is moved in a direction of a position of the one function key, the controller 180 may control the touch screen 151 to change the screen information 20 to correspond to the moved degree of the touch.

In this instance, the controller 180 may output on the adjustment bar 3 information 3a, which is related to a degree that the output state of the screen information 20 is adjusted to correspond to the touch-moved degree. That is, when the screen information 20a is changed to the screen information 20b which has been scaled up in response to the movement of the touch, as illustrated in a third drawing of FIG. 3B, the controller 180 may control the touch screen 151 to output information related to the scaled-up degree.

Afterwards, as illustrated in a fourth drawing of FIG. 3B, when the touch is further moved to the one function key, the controller 180 may control the touch screen 151 to output information 3b, which is related to a degree that the screen information 20 is changed to correspond to the further-moved degree.

In this manner, when a plurality of function keys are output, the user can easily control an output state of screen information according to a function corresponding to one of the function keys, in response to a touch being moved to the one function key. Also, when an adjustment bar is output, the user can be provided with information related to a controlled degree of the screen information.

Also, when the change of the force of the touch is detected at a position corresponding to the one function key, the controller 180 may control the touch screen 151 to change the output state of the screen information based on a changed degree of the force of the touch.

That is, referring to FIG. 3C, in a state that an area 3b including a plurality of function keys is output, as illustrated in a third drawing of FIG. 3C, the touch may be moved toward one function key. When the force of the moved touch is changed at an arbitrary point on the touch screen 151, the controller 180 may change screen information 30 based on a changed degree of the force of the moved touch.

For example, as illustrated in a fourth drawing of FIG. 3C, when it is detected that the force of the touch which has been moved toward a position of a function key for changing brightness of the screen information 30 is more than a first force, the controller 180 may output a visual effect 4a corresponding to the touch with the first force or more at the point where the moved touch is located. Also, the controller 180 may control the touch screen 151 to change the screen information 30 into brighter screen information 30a based on the touch with the first force or more.

In this state, when it is detected that the first force of the touch is changed to a second force or more, the controller 180 may output a specific visual effect 4b corresponding to force more than the second force on the touch-applied point, and control the touch screen 151 to change the screen information 30b to brighter screen information 30b.

In this manner, the controller 180 may arrange the function keys at various positions such that the user can conveniently change the output state of the screen information by a simple method, such as moving the touch. Also, the user can easily control the screen information according to his or her intention in a simple manner such as changing the force of the touch, as well as moving the touch.

Meanwhile, when the function keys are changed into the function icons, a control involved in one of the function icons may be carried out in response to the touch being moved to the one function icon.

For example, in the state that the function icons are output, the controller 180 may provide information related to an execution of an application corresponding to one function icon, which is located at the touch-moved point, of the function icons. In this instance, while the touch is maintained on the one function icon, the controller 180 may control the touch screen 151 to provide the information related to the execution of the application corresponding to the one function icon.

As another example, when the touch is released after moved to the one function icon, the controller 180 may execute the application corresponding to the one function icon, and control the touch screen 151 to output an execution screen of the application corresponding to the one function icon on at least part of the touch screen 151.

In this instance, the controller 180 may execute a function corresponding to the one function icon while the specific function is executed, or terminate the executed specific function when the function corresponding to the one function icon is executed.

Hereinafter, description will be given of an exemplary embodiment related to function icons, with reference to the accompanying drawings.

Figure 4A:
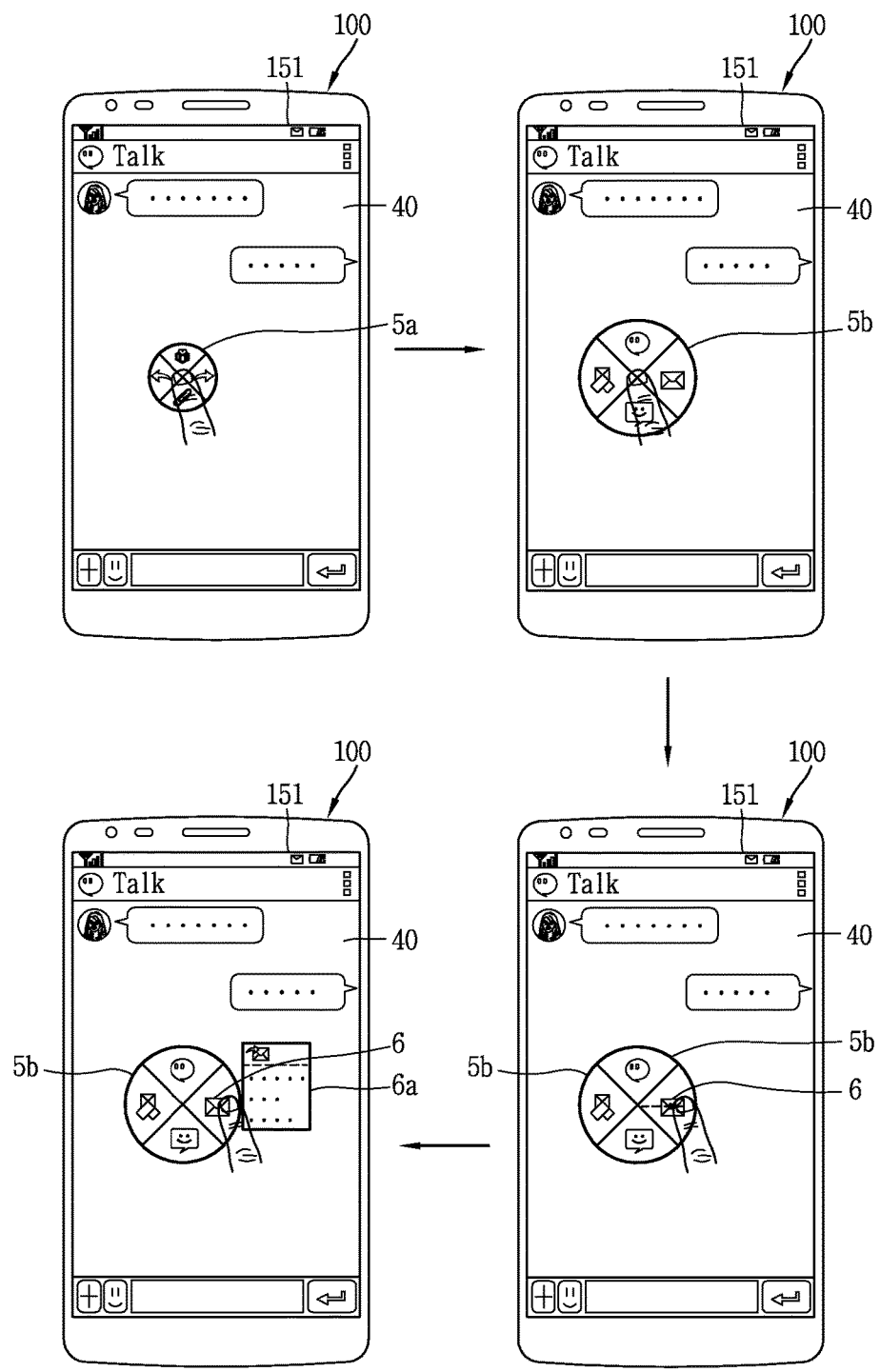
FIGS. 4A, 4B and 4C are views illustrating an exemplary embodiment of providing execution information related to a function icon based on a touch.
Figure 4B:
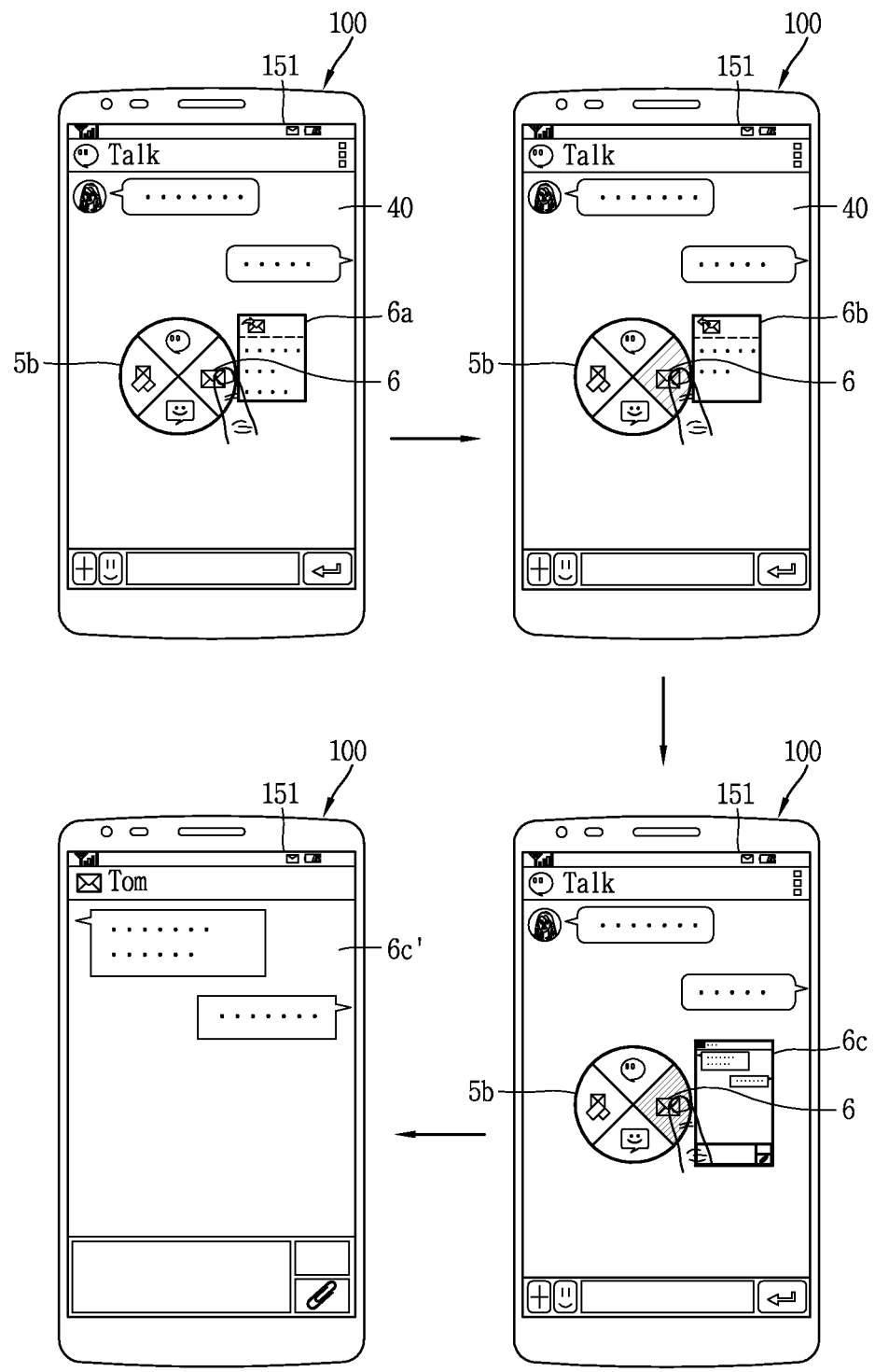
Figure 4C:
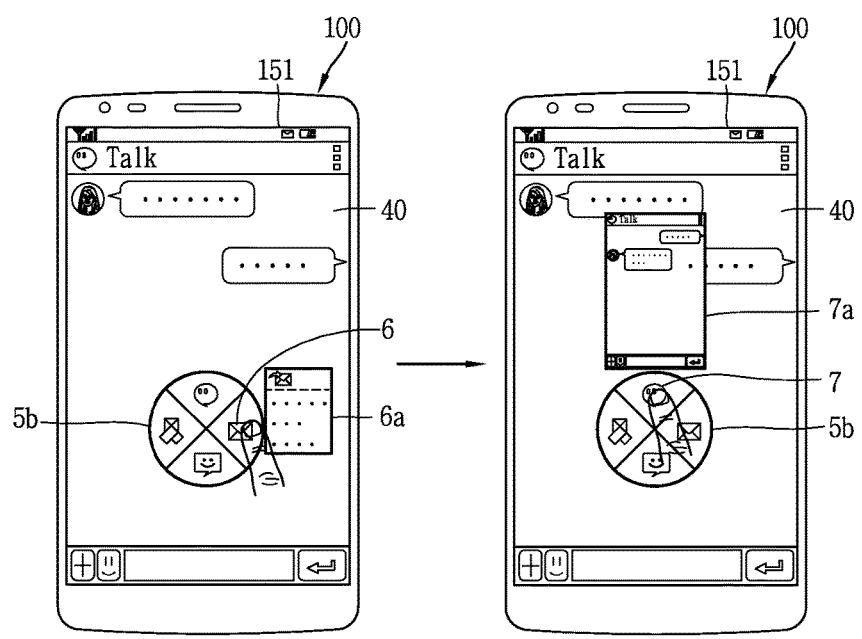

FIGS. 4A, 4B and 4C are views illustrating an exemplary embodiment of providing execution information related to a function icon based on a touch.

First, referring to FIG. 4A, in a state that screen information 40 corresponding to a specific function (e.g., a messenger function) is output on the touch screen 151, an area 5a including function keys may be output in response to a touch.

Afterwards, when it is detected that force of the touch is changed to a second force or more, the controller 180, as illustrated in a second drawing of FIG. 4A, may control the touch screen 151 to change the function keys into function icons for executing different functions associated with the specific function.

The controller 180 may also control the touch screen 151 to output an area 5b having a size corresponding to the touch force more than the second force, and output a preset number of function icons for executing the different functions on the area 5b.

In this instance, when the touch, as illustrated in a third drawing of FIG. 4A, is moved toward one function icon 6 of the function icons, the controller 180 may execute a control associated with the one function icon 6.

In more detail, as illustrated in a fourth drawing of FIG. 4A, the controller 180 may control the touch screen 151 to output preview information 6a, which is related to an execution screen of an application corresponding to the one function icon 6, on at least one area of the touch screen 151, while the touch is maintained on the one function icon 6.

When the change of the force of the touch is detected on the one function icon, the controller 180 may control the touch screen 151 to output preview information related to another execution screen of the application corresponding to the one function icon based on a changed degree of the force of the touch.

That is, as illustrated in a first drawing of FIG. 4B, when the force of the touch is changed in the state that the preview information 6a related to the execution screen of the application corresponding to the one function icon 6 is output, in response to the touch being maintained on the one function icon 6, as illustrated in a second drawing of FIG. 4B, preview information 6b related to another execution screen of the application corresponding to the one function icon 6 may be output.

Here, the preview information related to the different execution screens may be preview information related to execution screens of different sub menus, which are included in the application corresponding to the one function icon.

For example, when it is detected that the force of the touch is changed by about a first change degree, the controller 180 may control the touch screen 151 to output preview information related to an execution screen of a first sub menu included in the application corresponding to the one function icon 6. Also, when it is detected that the force of the touch is changed by about a second change degree, the controller 180 may control the touch screen 151 to output preview information related to an execution screen of a second sub menu included in the application corresponding to the one function icon 6.

Therefore, while the preview information 6b related to an execution screen of one sub menu of the application corresponding to the one function icon 6 is output, when the change of the force of the touch is detected again, as illustrated in a third drawing of FIG. 4B, preview information 6c related to an execution screen of another sub menu may be output.

Afterwards, when the touch is released in the output state of the preview information 6c, as illustrated in a fourth drawing of FIG. 4B, the controller 180 may control the touch screen 151 to output an execution screen 6c' corresponding to the preview information 6c currently output on the touch screen 151.

In this manner, the user can decide whether or not to execute an application corresponding to one function icon, by receiving preview information related to an execution screen of the application, prior to the execution of the application.

Also, when an application including a plurality of sub menus is executed, the user can be provided with convenience in immediately outputting an execution screen of a desired specific sub menu based on a change of force of a touch, without a process of re-searching and selecting the specific sub menu after the execution of the application.

Meanwhile, when the change of the touch force is detected, the controller 180 may control the touch screen 151 to change brightness of one area on which the one function icon is output, in response to the changed degree of the touch force. Therefore, the user can be provided with a feedback with respect to a change of force of a touch applied by himself or herself.

If the user needs to execute another function icon after checking preview information related to an execution screen of an application corresponding to the one function icon, the user's need may be satisfied in a manner of moving the touch.

That is, referring to FIG. 4C, after the preview information 6a related to the execution screen of the application corresponding to the one function icon is output, as illustrated in a second drawing of FIG. 4C, the user can move the touch toward another function icon 7, without release.

In this instance, when the touch is moved from the one function icon 6a to the another function icon 7 among the function icons after the preview information 6a is output, the controller 180 may control the touch screen 151 to change the preview information 6a into preview information 7a related to an execution screen of an application corresponding to the another function icon 7.

Therefore, the user can be provided with convenience in executing various functions after checking preview information related to each of the various function icons, in a manner of changing a location of a touch.

As aforementioned, when the touch is released while preview information corresponding to one function icon is output, the controller 180 may control the touch screen 151 to output an execution screen corresponding to the one function icon on at least a part of the touch screen 151.

In this instance, the controller 180 can execute the application corresponding to the one function icon after deactivating the activated specific function. Also, the controller 180 may execute the application corresponding to the one function icon while executing the specific function. The controller 180 may also control the touch screen 151 to output both screen information corresponding to the specific function and the execution screen of the application corresponding to the one function icon.

Figure 5A:
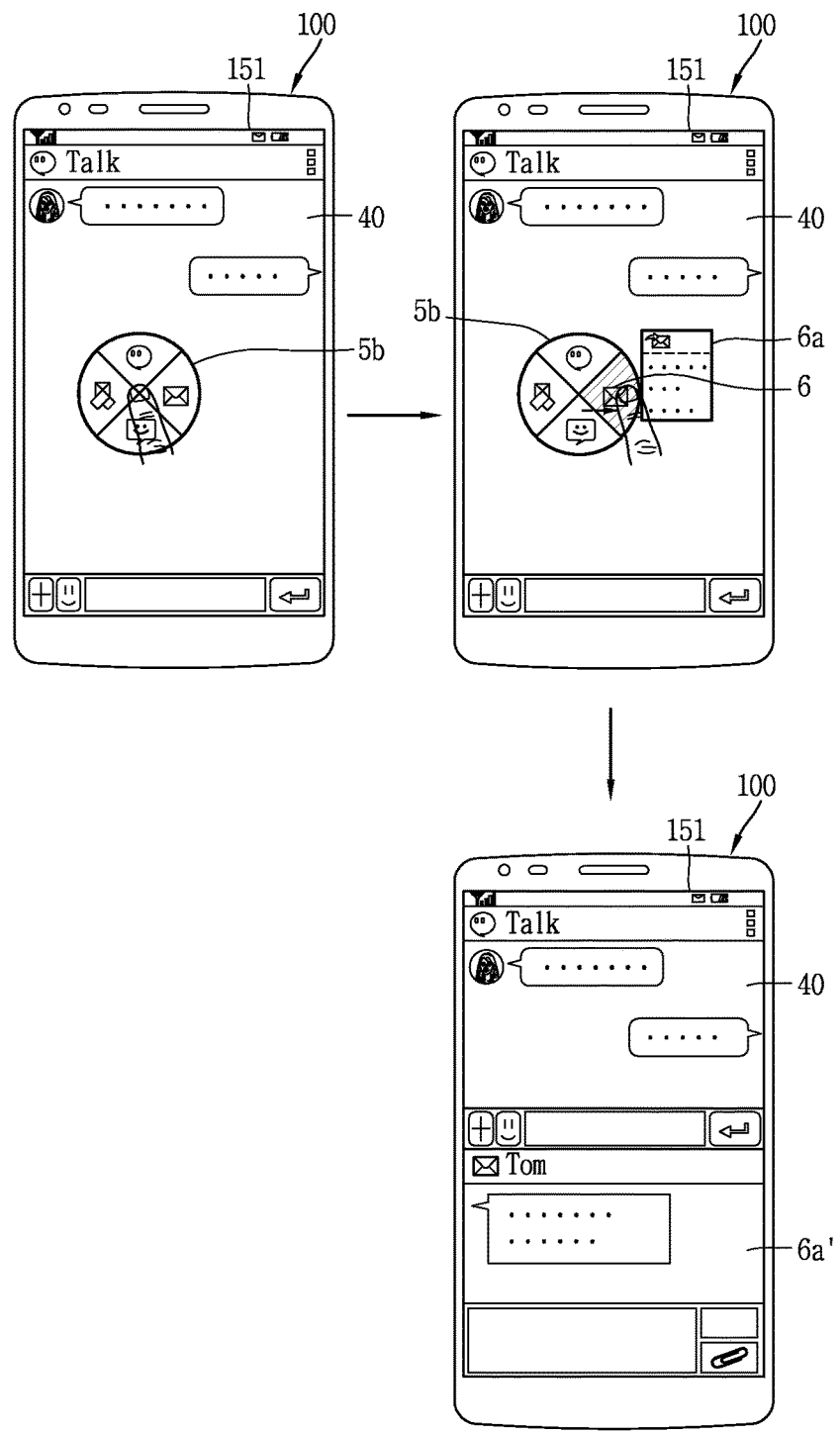
FIGS. 5A and 5B are views illustrating an exemplary embodiment involved in an output of an execution screen for one function icon.
Figure 5B:
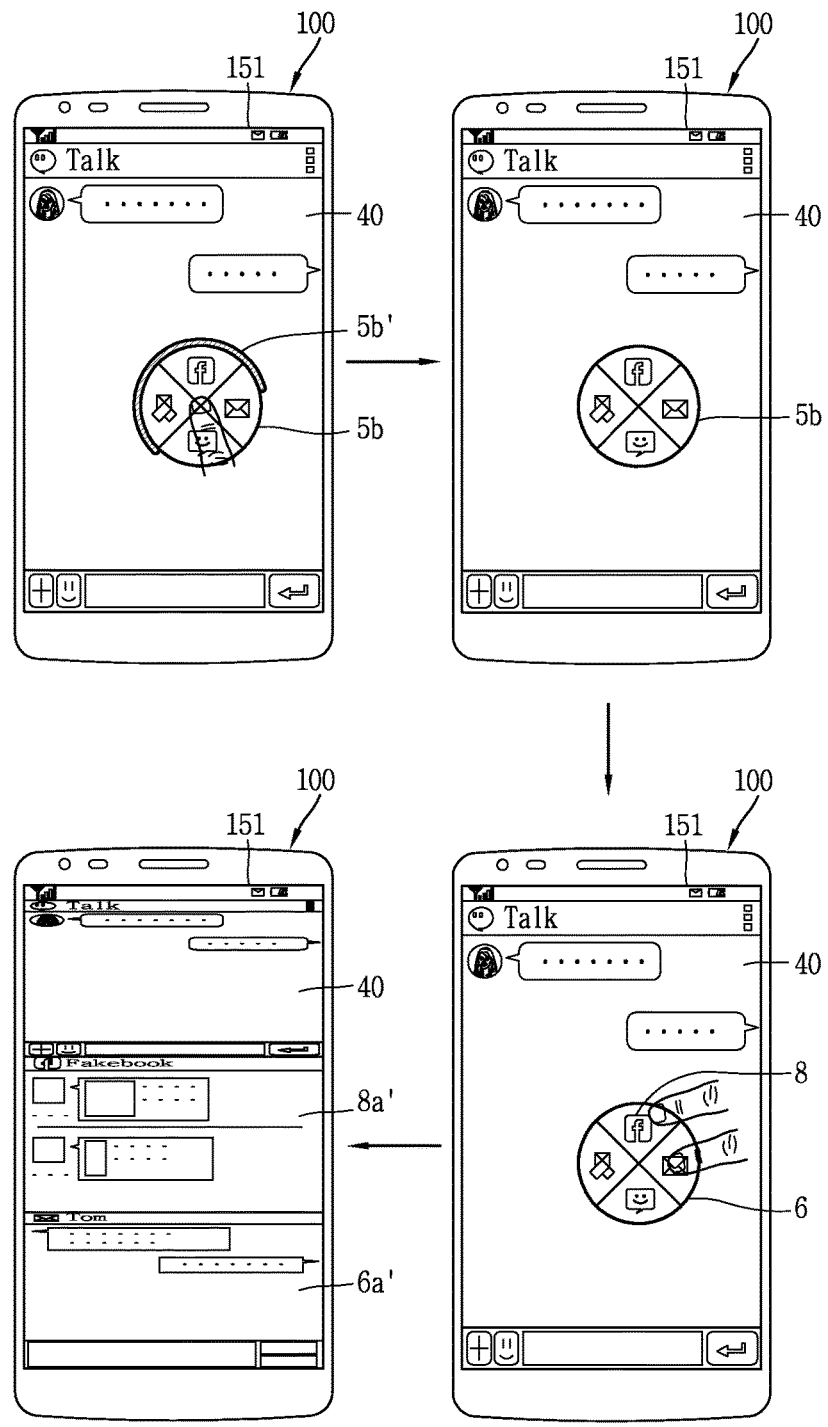

FIGS. 5A and 5B are views illustrating an exemplary embodiment involved in an output of an execution screen for one function icon.

First, referring to a first drawing of FIG. 5A, in a state that screen information 40 corresponding to a specific function is output on the touch screen 151, when it is detected that the force of the touch is more than the first force, an area 5b including a plurality of function keys may be output.

When the change of the force of the touch from the first force to the second force or more is detected, as illustrated in a second drawing of FIG. 5A, the controller 180 may change the function keys into function icons within the area 5b. In this instance, when the touch is moved to one function icon 6, the controller 180 may control the touch screen 151 to output preview information 6a related to an execution screen of an application corresponding to the one function icon 6.

Afterwards, when the touch is released, as illustrated in a third drawing of FIG. 5A, an execution screen 6a' corresponding to the preview information 6a may be output on the touch screen 151 along with the screen information 40 corresponding to the specific function.

On the contrary, as illustrated in a first drawing of FIG. 5B, in the state that the area 5b including the function icons is output, when the touch is maintained for a preset period of time or more, the controller 180 may output an indicator 5b' which is changed in response to a maintained time of the touch. When the indicator 5b' is changed by a preset condition, the controller 180, as illustrated in a second drawing of FIG. 5B, may control the touch screen 151 to continuously output the area 5b including the function icons even when the touch is released.

In this state, as illustrated in a third drawing of FIG. 5B, the controller 180 may execute applications corresponding to at least two function icons 6 and 8, in response to touches applied to the at least two function icons 6 and 8 in a simultaneous manner. As illustrated in a fourth drawing of FIG. 5B, the controller 180 may control the touch screen 151 to output execution screens 6a' and 8a' of the applications corresponding to the at least two function icons 6 an d8, along with the screen information 40 corresponding to the specific function.

That is, in addition to the execution of the one function icon by moving the touch, the user can simultaneously execute applications corresponding to a plurality of function icons, respectively, after continuously applying the touch for the preset period of time or more.

Meanwhile, the mobile terminal according to one exemplary embodiment disclosed herein can output different types of function keys and function icons according to a position to which the touch is applied on the touch screen 151, while screen information corresponding to a specific function is output.

Figure 6A:
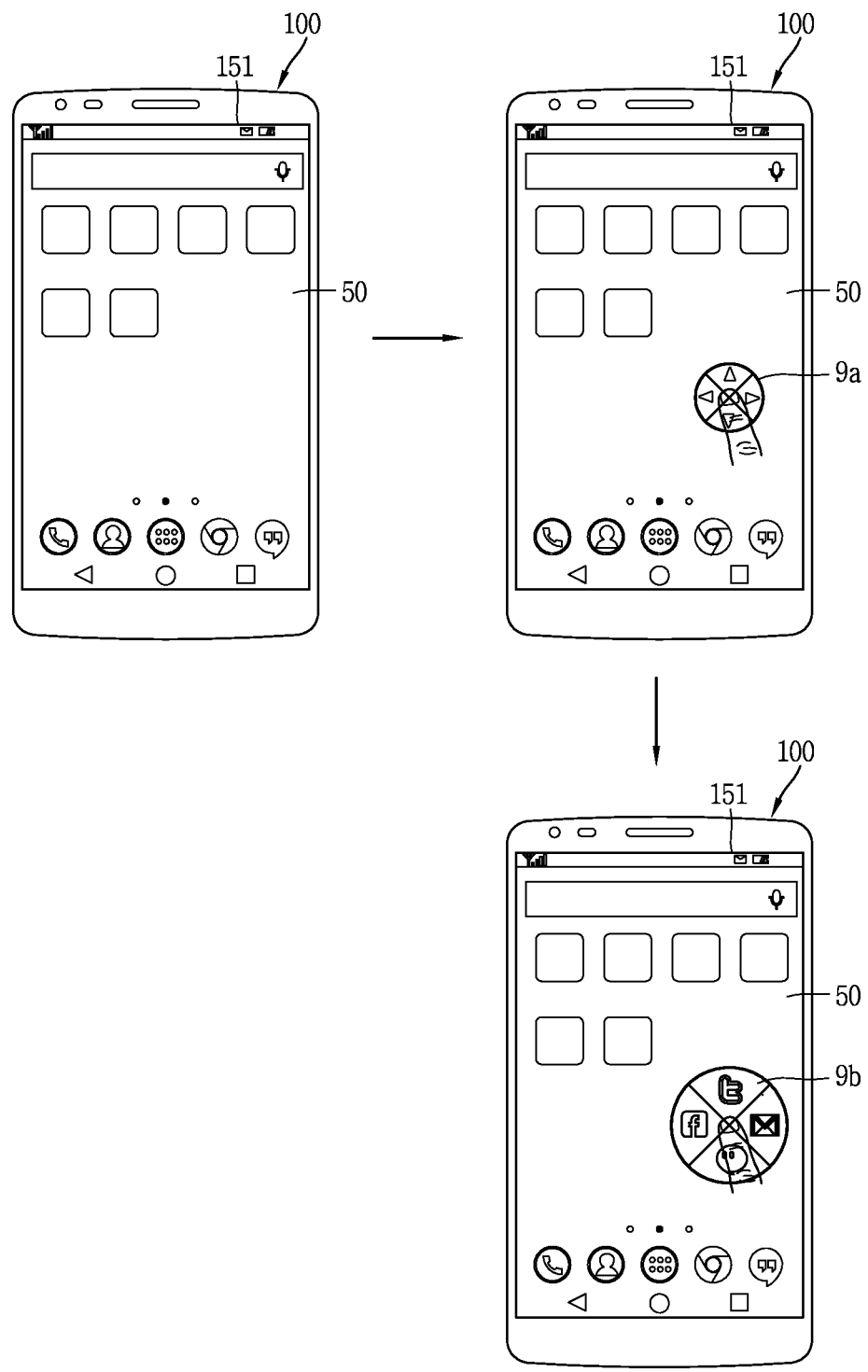
FIGS. 6A and 6B are views illustrating an exemplary embodiment of outputting different types of function keys and function icons based on touches applied to different positions on a home screen page.
Figure 6B:
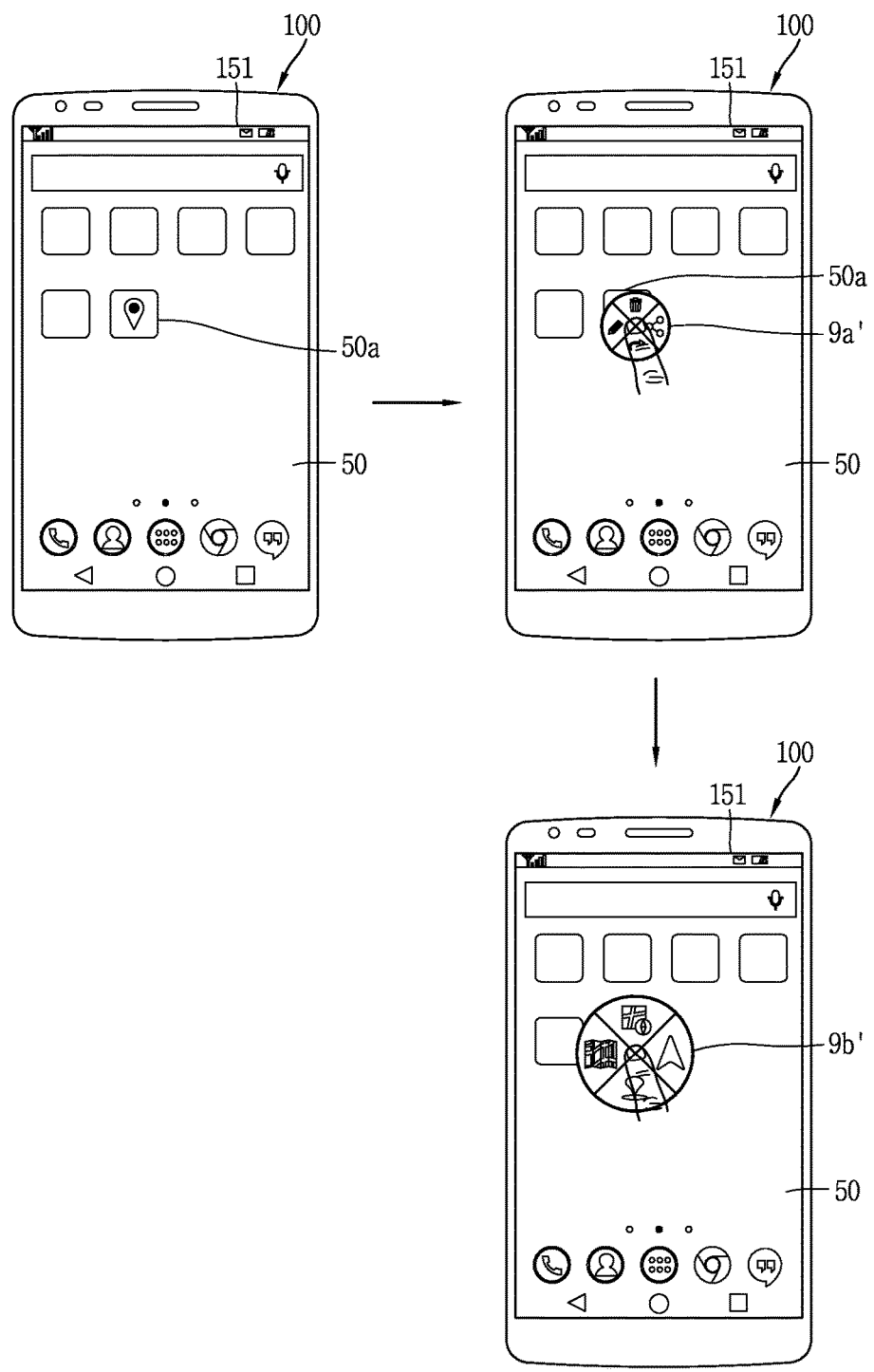

FIGS. 6A and 6B are views illustrating an exemplary embodiment of outputting different types of function keys and function icons based on a touch applied to a different position on a home screen page.

First, referring to a first drawing of FIG. 6A, in a state that a home screen page 50 is output on the touch screen 151, when it is detected that force of a touch applied to one area without an icon is more than a first force, the controller 180 may control the touch screen 151 to output function keys 9a corresponding to a page switching function of the home screen page 50.

Afterwards, when the change of the force of the touch from the first force to a second force or more is detected, the controller 180 may control the touch screen 151 to change the function keys 9a into preset function icons 9b. Here, the preset function icons, for example, may correspond to icons of applications which have been executed by the user at a preset frequency or more.

On the contrary, as illustrated in a second drawing of FIG. 5B, after the touch is applied to one icon 50a included on the home screen page 50, when it is detected that the force of the touch is changed to the first force or more, the controller 180 may control the touch screen 151 to output function keys 9a' involved in the one icon 50a. Here, the function keys 9a' involved in the one icon 50a may include function keys corresponding to functions by which settings of the one icon 50a can change (e.g., deleting, changing a name, etc.) on the home screen page 50.

Afterwards, when it is detected that the force of the touch is changed to the second force or more, as illustrated in a third drawing of FIG. 6B, the controller 180 may control the touch screen 151 to change the function keys 9a' into function icons 9b'. Here, the function icons 9b' may be execution icons of functions (e.g., functions which are frequently executed along with or exhibit similar attribute information to the function corresponding to the one icon 50a) involved in the function corresponding to the one icon 50a.

In this manner, the controller 180 can output different types of function keys and function icons on the same screen information according to an applied point of a touch, thereby providing various interfaces to the user.

Also, when a touch which is applied by the first force or more is moved, the controller 180 may also execute a specific function involved in an area to which the touch has been moved.

Figure 7:
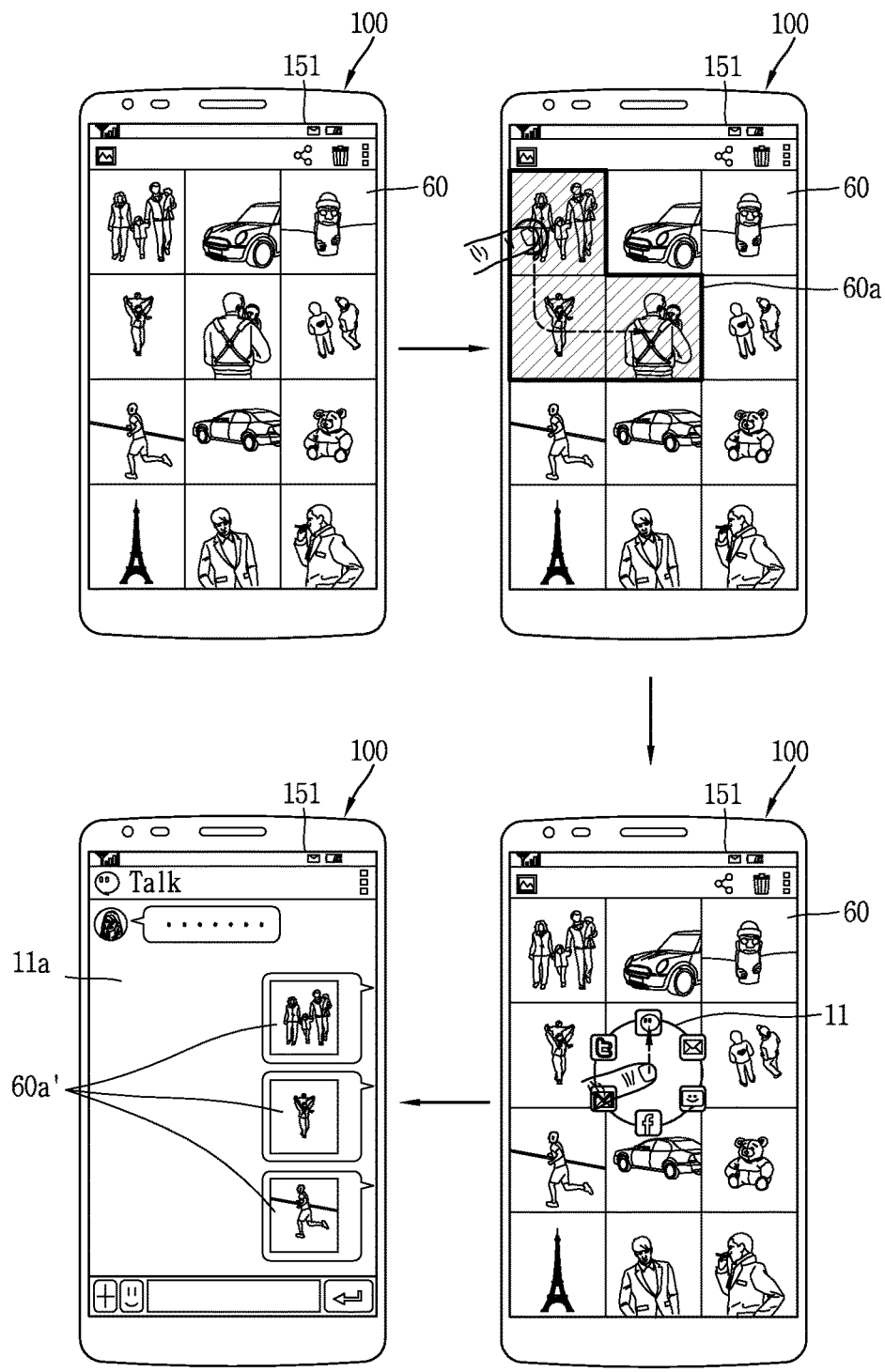
FIG. 7 is a view illustrating an exemplary embodiment of performing a control associated with an area to which a touch applied by a specific force or more has been moved on a touch screen.

FIG. 7 is a view illustrating an exemplary embodiment of performing a control involved in an area, in which a touch applied by a specific force or more is moved on the touch screen.

Referring to a first drawing of FIG. 7, in a state that specific screen information 60 including a plurality of select objects is output on the touch screen 151, as illustrated in a second drawing of FIG. 7, a touch may be applied by a specific force or more while moving along at least part of the plurality of select objects.

In this instance, the controller 180 may execute a control associated with several select objects 60a corresponding to an area in which the touch applied by the specific force or more has been moved. For example, when the touch applied by the specific force or more is maintained at one point of the touch screen 151 for a preset period of time or more, the controller 180 may control the touch screen 151 to output function icons corresponding to functions which are executable by using the several select objects 60a.

As illustrated in a third drawing of FIG. 7, when the touch is released after moved to one function icon 11 of the function icons, an application corresponding to the one function icon 11 may be executed and the several select objects 60a may be used for executing the application corresponding to the one function icon 11.

As a more detailed example, when the one function icon 11 corresponds to an application having a messenger function, the controller 180 may transmit the several select objects 60a to another party in response to the execution of the messenger function. As illustrated in a fourth drawing of FIG. 7, the controller 180 may control the touch screen 151 to output images 60a' of the several select objects transmitted to the another party on an execution screen 11a of the application having the messenger function.

Therefore, the user can obtain an effect of directly using objects included in one function for executing another function in a manner of adjusting force and time of a touch.

The mobile terminal according to one exemplary embodiment disclosed herein can control an output state of screen information corresponding to a specific function or provide objects (function keys, function icons, etc.) by which another function involved in the specific function can be executed, in response to a change of force of a touch, while the screen information corresponding to the specific function is output. Therefore, the user can control the screen information in various manners merely by changing the force of the touch.

The function keys or function icons may be output within a preset distance from a point to which the touch is applied, which may provide the user with convenience in executing various functions merely by moving the touch within a predetermined distance or changing the force of the touch.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touchscreen; and
a controller configured to:
cause the touchscreen to display screen information according to a first function;
cause the touchscreen to display a function key when force of a touch received at the touchscreen exceeds a first value, wherein the function key permits user control of an output state of the screen information;
cause the touchscreen to display a function icon when the force of the touch exceeds a second value that is greater than the first value, wherein the function icon is for executing a second function that is different from the first function;
cause the touchscreen to display first preview information related to an execution screen of an application corresponding to one of a plurality of functions of the function key when the touch is received at a displayed location of the one of the plurality of functions; and
cause the touchscreen to terminate the displaying of the first preview information and display second preview information related to an execution screen of an application corresponding to the one of the plurality of functions based on a changed degree of the force of the touch.

2. The terminal of claim 1, wherein the function key includes a plurality of functions individually corresponding to a plurality of different types of functions, wherein the controller is further configured to:
change the output state of the screen information according to a corresponding one of the plurality of functions when the touch is released at a displayed location of the corresponding one of the plurality of functions.

3. The terminal of claim 2, wherein the function key and the plurality of functions are displayed at a preset distance from a location at which the touch is received at the touchscreen; and
wherein the controller is further configured to vary a degree of change of the changed output state of the screen information according to an amount that the touch is moved relative to the displayed location of the corresponding one of the plurality of functions.

4. The terminal of claim 2, wherein the controller is further configured to vary a degree of change of the changed output state of the screen information according to an amount of the force of the touch, when the touch is received at a displayed location of the corresponding one of the plurality of functions.

5. The terminal of claim 1, wherein the second function includes an attribute similar to an attribute of the first function.

6. The terminal of claim 5, wherein the attribute is related to at least one of a type, execution frequency, executed time, or setting information, involved in an application corresponding to the second function.

7. The terminal of claim 1, wherein the controller is further configured to:
cause the touchscreen to display the execution screen when the touch is released while the first preview information is displayed; and
cause the touchscreen to terminate the displaying of the first preview information and display second preview information related to an execution screen of an application corresponding to another function of the plurality of functions when the touch is moved from a displayed location of the one of the plurality of functions to a displayed location of another one of the plurality of functions.

8. The terminal of claim 1, wherein the controller is further configured to:
cause the touchscreen to display preview information related to an execution screen of a first sub menu included in the application corresponding to the one of the plurality of functions of the function key when the force of the touch is changed by a first amount; and
cause the touchscreen to display preview information related to an execution screen of a second sub menu included in the application corresponding to the one of the plurality of functions of the function key when the force of the touch is changed by a second amount.

9. The terminal of claim 1, wherein the controller is further configured to:
cause the touchscreen to terminate the displaying of the function key when the force of the touch exceeds the second value.

* * * * *